(12) United States Patent
Stiller

(10) Patent No.: US 9,120,423 B2
(45) Date of Patent: Sep. 1, 2015

(54) LIGHTING DEVICE FOR VEHICLES

(71) Applicant: Hella KGaA, Lippstadt (DE)

(72) Inventor: Niklas Stiller, Erwitte (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 13/631,287

(22) Filed: Sep. 28, 2012

(65) Prior Publication Data

US 2013/0088883 A1 Apr. 11, 2013

(30) Foreign Application Priority Data

Mar. 30, 2010 (DE) .......................... 10 2010 013 484
Mar. 30, 2011 (WO) .................. PCT/EP2011/054891

(51) Int. Cl.
*F21S 8/10* (2006.01)
*B60Q 1/26* (2006.01)
*F21Y 101/02* (2006.01)
*F21Y 113/02* (2006.01)

(52) U.S. Cl.
CPC ............... *B60Q 1/26* (2013.01); *B60Q 1/2607* (2013.01); *F21S 48/1154* (2013.01); *F21S 48/215* (2013.01); *F21Y 2101/02* (2013.01); *F21Y 2113/02* (2013.01)

(58) Field of Classification Search
CPC ...... B60Q 1/2696; B60Q 1/302; B60Q 1/305; B60Q 3/06; B60Q 3/02; F21Y 2101/02; F21Y 2113/005; F21S 48/215; F21S 48/10; F21S 48/115; F21S 48/212; F21V 5/04; F21V 23/005; F21V 13/02; F21V 13/04; F21V 23/06; G02B 5/1876

USPC ............... 362/240–246, 249.01, 249.02, 268, 362/294, 326–331, 373–375, 521, 540–549, 362/485, 498, 499

See application file for complete search history.

(56) References Cited

U.S. PATENT DOCUMENTS

| | | | | |
|---|---|---|---|---|
| 4,831,503 | A * | 5/1989 | DeSantis et al. ............... | 362/497 |
| 6,092,916 | A * | 7/2000 | Davis et al. .................... | 362/490 |
| 6,268,801 | B1 * | 7/2001 | Wu ............................ | 340/815.45 |
| 6,276,822 | B1 * | 8/2001 | Bedrosian et al. ............ | 362/545 |
| 6,502,956 | B1 * | 1/2003 | Wu ................................ | 362/237 |
| 6,599,000 | B2 * | 7/2003 | Nolan et al. ................... | 362/414 |
| 6,616,299 | B2 * | 9/2003 | Martineau ...................... | 362/244 |

(Continued)

FOREIGN PATENT DOCUMENTS

| | | |
|---|---|---|
| DE | 102004053320 A1 | 6/2005 |
| DE | 102006052749 A1 | 5/2007 |
| WO | PCT/EP2011/054891 | 3/2011 |

OTHER PUBLICATIONS

Mar. 30, 2010 German Search Report.

*Primary Examiner* — Hargobind S Sawhney
(74) *Attorney, Agent, or Firm* — Husch Blackwell, LLP

(57) ABSTRACT

The invention relates to a lighting device for vehicles, particularly for tractors and trailers, with a housing to which light sources of differing light generating types can be exchangeably fastened in an installed state, wherein the light sources of differing light generating types are assigned at least one optic element for the formation of a light module, which is detachably connectable to a carrier frame of the housing, and which generated a defined light function, and wherein a single lens is placed in front of the light modules of differing light generating types in the installed state and the carrier frame.

6 Claims, 4 Drawing Sheets

(56) References Cited

U.S. PATENT DOCUMENTS

| | | | |
|---|---|---|---|
| 6,749,324 B2 * | 6/2004 | Nagai et al. | 362/490 |
| 6,791,840 B2 * | 9/2004 | Chun | 361/715 |
| 6,814,459 B2 * | 11/2004 | Pederson | 362/35 |
| 6,905,227 B2 * | 6/2005 | Wu | 362/240 |
| 6,939,029 B1 * | 9/2005 | Stahel et al. | 362/545 |
| 6,981,784 B2 * | 1/2006 | Dubuc | 362/331 |
| 7,097,225 B2 * | 8/2006 | Huisingh et al. | 296/37.7 |
| 7,182,383 B2 * | 2/2007 | Anderson et al. | 296/37.8 |
| 7,488,097 B2 * | 2/2009 | Reisenauer et al. | 362/373 |
| 7,883,226 B2 * | 2/2011 | Li | 362/84 |
| 8,033,682 B2 * | 10/2011 | Catalano et al. | 362/202 |
| 2002/0122309 A1 * | 9/2002 | Abdelhafez et al. | 362/294 |
| 2004/0202006 A1 | 10/2004 | Pien | |
| 2008/0259629 A1 | 10/2008 | Takuwa | |
| 2009/0207602 A1 * | 8/2009 | Reed et al. | 362/225 |

\* cited by examiner

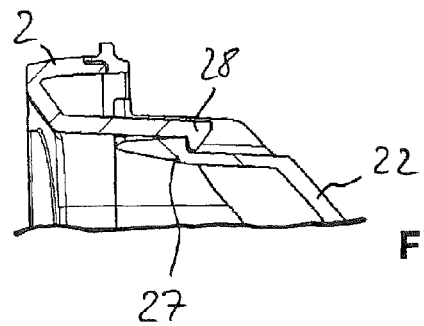
Fig. 5
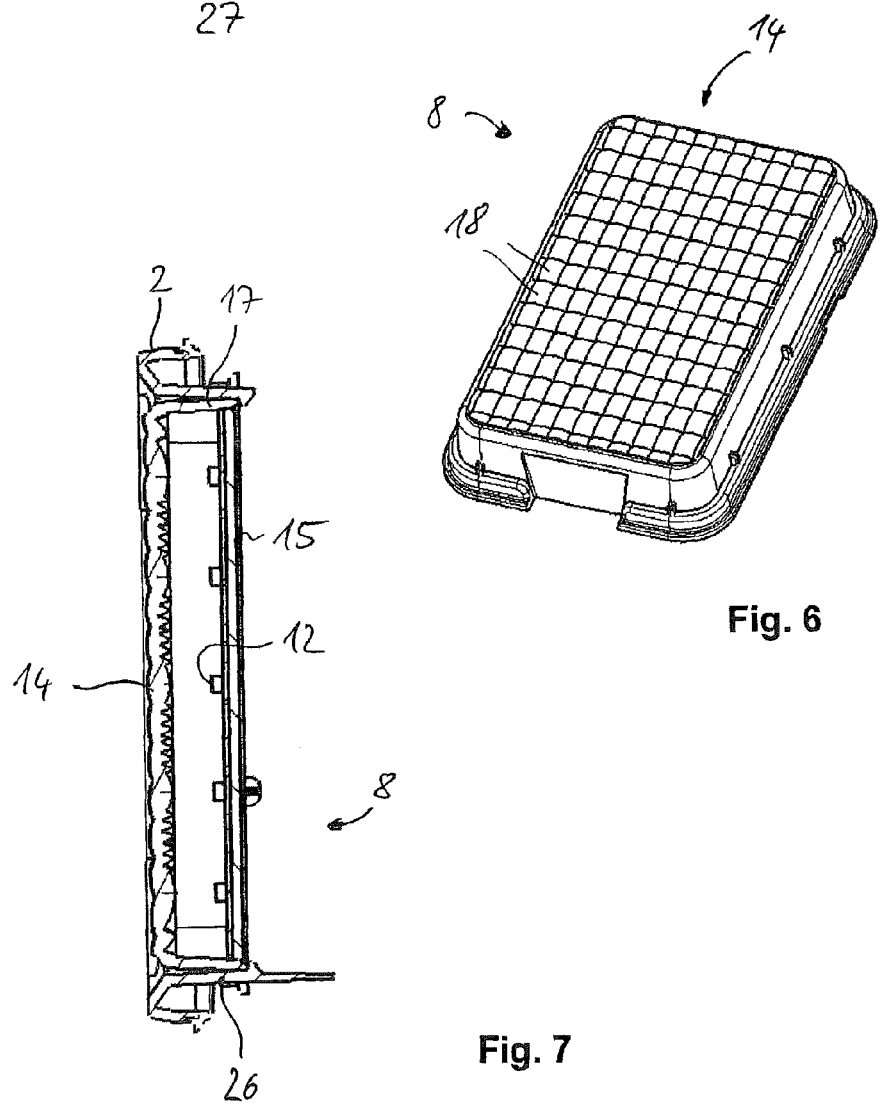
Fig. 6
Fig. 7

LIGHTING DEVICE FOR VEHICLES

CROSS REFERENCE

This application claims priority to PCT Application No. PCT/EP2011/054891, filed Mar. 30, 2011, which in turn claims priority to German Patent Application No. 10 2010 013484.8, filed Mar. 30, 2010.

TECHNICAL FIELD OF THE INVENTION

The invention relates to a lighting device for vehicles, particularly for tractors and trailers, having a housing in which replaceable light sources of differing light generating types can be fastened in an installed state.

BACKGROUND OF THE INVENTION

From EP 1 627 772 A1, a lighting device for vehicles is known, which allows the replacement of a bulb light source by a light diode light source for the generation of the defined light function. To this end, a housing of the lighting device has a lamp holder, so that on the one hand a base of a bulb and on the other hand electrical contacting means of the LED light source can be used. The lighting device according to the prior art does therefore allow the integration of light sources of different light generating types in one housing, wherein the bulb is designed as a thermal radiation emitter and the light diode as a non-thermal radiation emitter. A disadvantage of the known lighting device is, that not only the light sources have to be replaced, but also all optic elements including a lens covering the opening of the housing.

SUMMARY OF THE INVENTION

The aim of the present invention is, therefore, the further development of a lighting device for vehicles to simplify the re-fitting of light sources of differing light generating types.

In accordance with an object of the invention, there is provided a light source of differing light generating types have assigned at least one optic element for the formation of a light module being detachably connectable with a carrier frame of the housing and generating a defined lighting function, and wherein a single lens with the same optic structure is placed in front of the light modules of differing light generating types in the installed state and the carrier frame.

According to an embodiment of the invention, light modules are formed which each comprise a light source of a defined light generating type and an optic element matched with the light source. By this means, the given light function is essentially determined by the replaceable light module itself, so that a lens arranged in the light radiating direction in front of the light module does not have to be replaced. For refitting, it is only necessary to remove the covering lens, replace the light modules and then to fasten the covering lens once again. Advantageously, a relatively simple and fast refitting is possible by this means. In addition, the reuse of the same parts, as e.g. the covering lens, the carrier frame and the housing, may result in cost savings.

According to one embodiment of the invention a first light module is executed as a bulb light module with a bulb and a reflector as optic element. A second light module is embodied as an LED light module with a number of light diodes and an optic lens. The bulb light module and the LED light module may be inserted alternatively in an opening of the carrier frame, wherein the transverse extension of the light modules preferably corresponds to the light-emitting surface of the lens. The light distribution is therefore essentially determined by the light module itself.

According to a preferred embodiment of the invention, the light modules each have contacting means for the contacting of the light source to an electric lead connected to an electric energy source. Preferably, the electric lead is executed as a cable so that the contacting may be executed in a space covered by the light module.

According to another embodiment, the carrier frame is embodied as a decorative bezel, which does not only serve for the fastening of the light module, but also defines or limits a light aperture.

According to another embodiment, the light module is connected with the carrier frame by means of snap-fastening, so that a quick and easy replacement of the light modules is made possible.

According to another embodiment, the carrier frame has several openings, each containing a light module with a different light function. Advantageously, the light modules can be fastened to the opening edged of the carrier frame according to their light function as so-called individual modules. Advantageously, a variable provision of different light functions may be achieved.

According to a development of the invention, the light modules are provided with a coding marking the light function, so that during the replacement of the light modules, a simple assignment of the respective light functions to the carrier frame openings is given.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

A lighting device according to the invention for vehicles can particularly be used for tractors and trailers.

FIGS. 1-9 illustrate various views and components of the lighting device that is the subject of the present invention. The various views and components are referred to in the description that follows.

Figure 1:
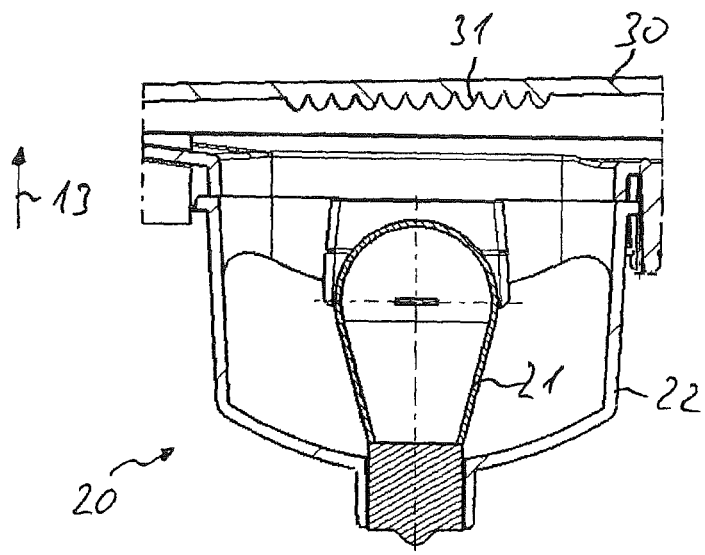
FIG. 1 A cross-section through an elongated lighting device according to FIG. 9 with a lamp chamber in which a bulb light module is integrated, FIG. 2 A cross-section through the lamp chamber according to FIG. 1, in which the bulb light module is replaced by an LED light module, FIG. 3 A perspective front view of a bulb light module, FIG. 4 A cross-section through the bulb light module being detachably fastened to a carrier frame, FIG. 5 A magnified representation of a fastening section between the bulb light module and the carrier frame according to FIG. 4, FIG. 6 A perspective front view of an LED light module, FIG. 7 A cross-section through the LED light module fastened to the carrier frame, FIG. 8 A magnified representation of a fastening section of the LED light module to the carrier frame according to FIG. 7 and FIG. 9 A front view of an elongated carrier frame with a number of openings, in which LED light modules of different light functions are arranged.
Figure 2:
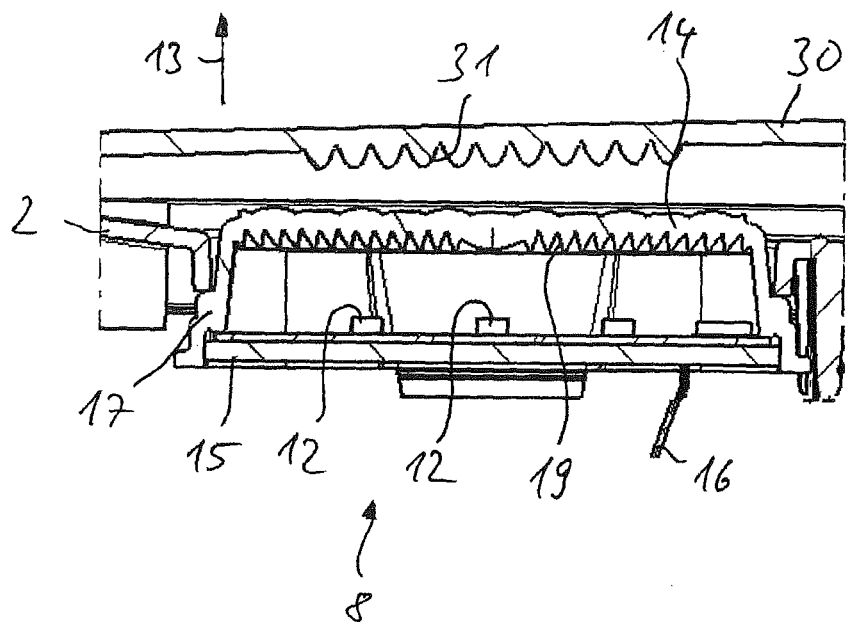
Figure 3:
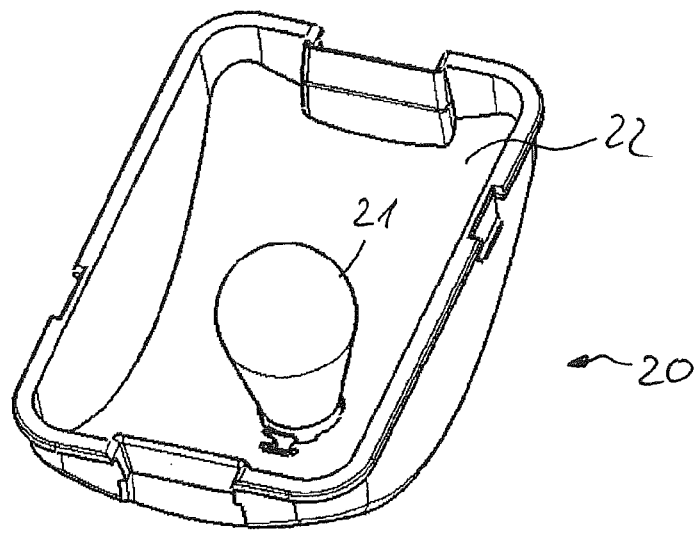
Figure 9:
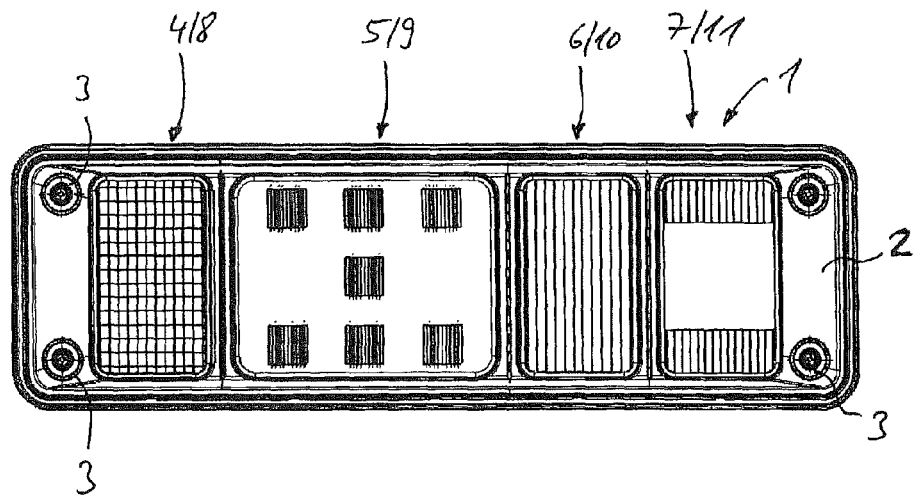

The lighting device has an elongated housing 1 being rectangular in the top view, onto which a carrier frame 2 can essentially be placed flush and which is friction-lockable for example by means of screw fastenings 3. The carrier frame 2 has 4 openings 4, 5, 6, 7 to which light modules 8, 9, 10, 11 for the generation of differing light functions can be assigned. A first opening 4 may e.g. be assigned a first light module 8 for the generation of a direction indicator function, a second opening 5 a second light module 9 for the generation of a combination tail light/stop light function, a third opening 6 a third light module 10 for the generation of a reversing light function and a fourth opening 7 a fourth light module 11 for the generation of a combination rear fog lamp/license plate lamp function. In FIG. 9, LED light modules 8, 9, 10, 11 are assigned to the openings 4, 5, 6, 7, which each have a number of LEDs 12 (light diodes) as well as an optic lens 14 arranged in front in the light radiating direction 13 as an optic element. The light diodes 12 are arranged on a common printed circuit board 15, from whose rear side protrude contacting means 16 for the connection to an electric lead, which is not represented, being connected to an electric energy source of the vehicle. In an exemplary embodiment the electric lead may be a cable, wherein the contacting means 16 also being embodied as cables are connected to the electric lead by means of plug-in contacts, which are not represented. The optic lens 14 is tub-shaped and mechanically tightly connected to the printed circuit board 15 by means of a circumferential fastening edge 17. As can be seen in FIG. 6, the optic lens 14 has a pillow optics 18 on one outside. As can be seen in FIG. 2, the optic lens 14 has a Fresnel structure 19 on the inside.

The lighting device is designed to not only receive LED light modules 8, 9, 10, 11, but also light modules of a differing light generating type. In the present embodiment, a bulb light module 20 each may alternatively be inserted in the openings 4, 5, 6, 7, having a bulb with a light generating type differing from the light diode 12. The bulb light module 20 therefore has a bulb as a thermal radiation emitter; the LED light module 8, 9, 10, 11 has a light diode 12 as a non-thermal radiation emitter.

Figure 4:
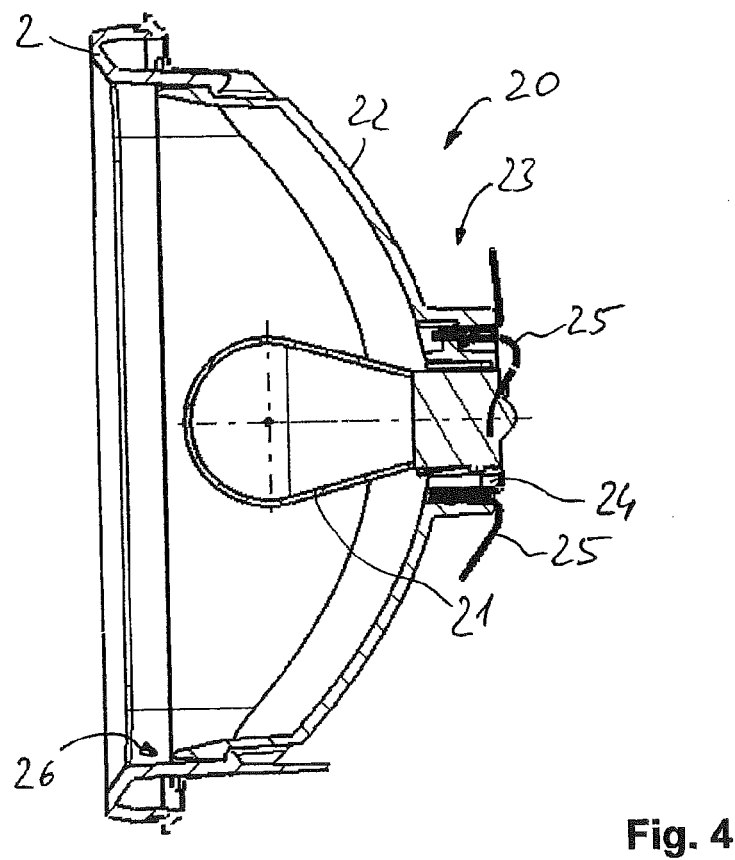
Figure 8:
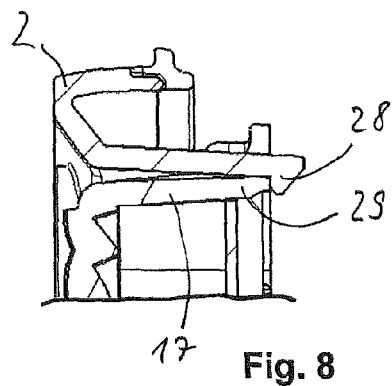

The bulb light module 20 has essentially a bulb 21 and a reflector 22 as an optic element. As can be seen in FIG. 4, the reflector 22 has holding means 24 for the fastening of the bulb 21 to the reflector 22 in a vertex 23. Furthermore, the reflector 22 has contacting means 25 for the contacting of the bulb 21 with an electric lead connected with the electric energy source in the vertex 23. This is the same electric lead being used for the LED light module 8, 9, 10, 11.

The LED light module 8 and the bulb light module 20 can be exchangeably fastened to an edge 26 of the carrier frame 2. To this end, the reflector 22 of the bulb light module 20 has at a front edge a circumferential snap-fastening element 27 at least in sections, which engages with barb-type hooks behind a corresponding inner snap-fastening element 28 (snap-fastening hooks) of the carrier frame 2 in the installed state of the light module. Furthermore, the fastening edge 17 of the optic lens 14 of the LED light module 8 has a snap-fastening element 29 on its outer edge, which, in the installed state of the bulb light module 20 interoperates with the snap-fastening element 28 of the carrier frame 2, so that the LED light module 8 in the installed state is connected with the carrier frame 2 by snap-fastening. The carrier frame 2 also serves as a decorative bezel and may therefore be metalized, for example.

The light modules 8, 9, 10, 11 and 20 are therefore essentially tightly connected with the carrier frame 2 in the installed state by means of snap fastening. The openings 4, 5, 6, 7 of the carrier frame 2 limit a light aperture of the light modules 8, 9, 10, 11, 20. A single lens 30 with an optic structure being embodied as profiling 31 on an inside, covering the housing 1, is arranged in the light exit direction 13 in front of the light modules 8, 9, 10, 11, 20 and the carrier frame 2.

The profiling 31 is embodied so that the defined light function is given on the one hand when the LED light module 8, 9, 10, 11 is installed and on the other hand when the bulb light module 20 is installed. The transverse extension of the light modules 8, 9, 10, 11, 20 corresponds essentially to the light-active surface of the lens 30.

The light modules 8, 9, 10, 11, 20 are provided with a respective coding for them to be assignable to a defined light function.

To replace the bulb light module 20 by an LED light module, 9, 10, 11, the lens 30 fastened to the housing 1 or the carrier frame 2 is removed in a first step. Then, the light module to be replaced, which is fastened to the opening edge 26 of the carrier frame 2, is unlocked and the contacting means 25 are detached from the electric lead. In the next step, the LED light module 8 is mounted by connecting the contacting means 16 to the electric lead and by snap-fastening the fastening edge 17 to the carrier frame 2. Finally the lens 30 is fastened to the housing 1 again.

It is self-evident that the lens 30 may have a different profiling 31 depending on the defined light function. This profiling 31 does therefore depend on the light function. However, the same profiling 31 of the lens 30 is always used for the bulb light module 20 as well as for the LED light module 8, 9, 10, 11 for a defined light function.

According to an alternative embodiment which is not represented, a lighting device with single-function lamps may be executed, wherein the individual light modules 8, 9, 10, 11, 20 are arranged next to another or in a circle or with a distance between them, instead of the described multi-function lamp.

Possibly the profiling 31 of the lens 30 may also be embodied as a styling element without mainly photometric properties.

According to an alternative embodiment, the license plate lamp function may also be arranged separate from the other light functions.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be

| List of reference sign | |
|---|---|
| 1 | Housing |
| 2 | Carrier frame |
| 3 | Screw-fastening |
| 4 | Opening |
| 5 | Opening |
| 6 | Opening |
| 7 | Opening |
| 8 | Light module |
| 9 | Light module |
| 10 | Light module |
| 11 | Light module |
| 12 | LEDs |
| 13 | Light radiation direction |
| 14 | Optic lens |
| 15 | Printed circuit board |
| 16 | Contacting means |
| 17 | Fastening edge |
| 18 | Pillow optics |
| 19 | Fresnel structure |
| 20 | Bulb light module |
| 21 | Bulb |
| 22 | Reflector |
| 23 | Vertex |
| 24 | Holding means |
| 25 | Contacting means |
| 26 | Edge |
| 27 | Snap-fastening element |
| 28 | Snap-fastening element |
| 29 | Snap-fastening element |
| 30 | Lens |
| 31 | Profiling |

The invention claimed is:

1. A lighting device for vehicles, comprising:
a housing including a carrier frame;
a single lens affixed to said housing;
an LED module positioned within the housing behind the single lens, said LED module including at least one light emitting diode and an optic lens, said optic lens positioned in front of said light emitting diode and behind the single lens when said LED module is installed in said housing;
wherein said LED module is replaceable with a standard incandescent bulb such that the incandescent bulb illuminates through only the single lens; and
wherein one or more of a light module of a first light generating type and a second light generating type is connected by snap-fastening to the carrier frame in the installed state, and that the carrier frame is shaped as a decorative bezel limiting the light aperture of the installed light module.

2. The lighting device according to claim 1, wherein the optic lens of the LED module has a circumferential fastening edge for a mechanical connection with a printed circuit board.

3. The lighting device according to claim 1, further comprising a carrier frame including a number of openings, at whose edge the standard incandescent bulb is fastened.

4. The lighting device according to claim 3, wherein the carrier frame has a friction-locked connection with the housing.

5. The lighting device according to claim 3, wherein a first opening of the carrier frame has a direction indicator function and a second opening of the carrier frame has a tail light or stop light function and a third opening of the carrier frame has a reversing light function and a fourth opening of the carrier frame has a rear fog light or license plate light function, and wherein the first opening and the second opening and the third opening and the fourth opening of the carrier frame are covered by the same lens.

6. The lighting device according to claim 1, wherein the transverse extension of the standard incandescent bulb corresponds to a light active surface of the single lens.

* * * * *